United States Patent [19]
Henry et al.

[11] Patent Number: 5,596,661
[45] Date of Patent: Jan. 21, 1997

[54] MONOLITHIC OPTICAL WAVEGUIDE FILTERS BASED ON FOURIER EXPANSION

[75] Inventors: Charles H. Henry, Skillman; Edward J. Laskowski, Scotch Plains, both of N.J.; Yuan P. Li, Alpharetta, Ga.; Cecilia Y. Mak, Bedminster, N.J.; Henry H. Yaffe, Dunwoody, Ga.

[73] Assignee: Lucent Technologies Inc., Murray Hill, N.J.

[21] Appl. No.: 365,618

[22] Filed: Dec. 28, 1994

[51] Int. Cl.$^6$ .................................................. C02B 6/28
[52] U.S. Cl. ................................................................ 385/24
[58] Field of Search ................................... 385/15, 16, 20, 385/21, 24, 14, 31, 39, 42, 45, 48, 50

[56] References Cited

FOREIGN PATENT DOCUMENTS

| | | | |
|---|---|---|---|
| 0099193B1 | 1/1984 | European Pat. Off. . | |
| 53-20348 | 2/1978 | Japan | 385/24 |
| 2233109 | 1/1991 | United Kingdom | 385/24 |

OTHER PUBLICATIONS

"Resonant Couplers Acting as Add–Drop Filters Made with Silica–on–Silicon Waveguide Technology", by H. H. Yaffe, *Journal of Lightwave Technology*, vol. 12, No. 6, Jun. 1994.

"Planar Lightwave Circuit Dispersion Equaliser with a Wide Operational Frequency Range", by K. Takiguchi et al., *Electronics Letters*, vol. 30, No. 17, 18 Aug. 1994, pp. 1404–1406.

"Penalty Free Dual–Channel 10 Gbit/s Transmission Over 132 km Standard Fiber Using a PLC Delay Equalizer With –830 ps/nm", by K. Hagimoto, *OFC Optical Fiber Communications*, Technical Digest, Postdeadline Papers, Feb. 20–25, 1994, pp. 112–114.

"Planar Lightwave Circuits for Optical Signal Processing", by M. Kawachi et al., *OFC Optical Fiber Communication*, Technical Digest, vol. 4, Feb. 20–25, 1994, pp. 281–282.

K. Sasayama, et al. "Coherent Optical Transversal Filter Using Silica–Based Waveguides for High–Speed Signal Processing", *J. Lightwave Technology*, vol. 9, No. 10 pp. 1225–1230, Oct. 1991.

B. Moslehi, et al. "Fiber–Optic Lattice Signal Processing", *Proc. of The IEEE*, vol. 72, No. 7, pp. 909–930; Jul. 1984.

R. Adar, et al. "Wide–band Bragg reflectors made with silica on silicon waveguides", *Appl. Phys. Lett.*, vol. 60, No. 16, pp. 1924–1926; Apr., 1992.

R. C. Frye, "Silicon MCMs for Low Cost, High Volume Applications", *Semiconductor Equipment and Materials International*, pp. 79–84; Jan. 1991.

R. Day, et al. "A Silicon–on–Silicon Multichip Module Technology with Integrated Bipolar Components on the Substrate" *Proceedings of The IEEE*, ; Mar. 1994.

*Primary Examiner*—John Ngo
*Attorney, Agent, or Firm*—Glen E. Books; Eugen E. Pacher

[57] ABSTRACT

In accordance with the invention, a new type of monolithic optical waveguide filter comprises a chain of optical couplers of different effective lengths linked by differential delays of different lengths. The transfer of the chain of couplers and delays is the sum of contributions from all possible optical paths, each contribution forming a term in a Fourier series whose sum forms the optical output. A desired frequency response is obtained by optimizing the lengths of the couplers and the delay paths so that the Fourier series best approximates the desired response. The filter is advantageously optimized so that it is insensitive to uncontrolled fabrication errors and is short in length. The wavelength dependence of practical waveguide properties is advantageously incorporated in the optimization. Consequently, the filter is highly manufacturable by mass production. Such filters have been shown to meet the requirements for separating the 1.3 and 1.551 μm telecommunications channels and for flattening the gain of Er amplifiers.

17 Claims, 8 Drawing Sheets

$$t = ic_1c_2s_3 e^{i(\Theta_1+\Theta_2)} + ic_1s_2c_3 e^{i(\Theta_1-\Theta_2)}$$
$$- is_1s_2s_3 e^{i(-\Theta_1+\Theta_2)} + is_1c_2c_3 e^{i(-\Theta_1-\Theta_2)}$$

FIG. 3A

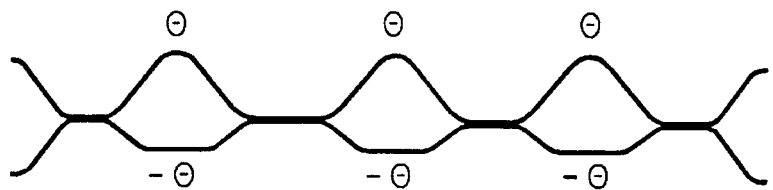

$\ominus + \ominus + \ominus = 3\ominus$     $-\ominus - \ominus - \ominus = -3\ominus$ $\left.\begin{array}{l}\ominus + \ominus - \ominus \\ \ominus - \ominus + \ominus \\ -\ominus + \ominus + \ominus\end{array}\right\} = \ominus$     $\left.\begin{array}{l}-\ominus - \ominus + \ominus \\ -\ominus + \ominus - \ominus \\ \ominus - \ominus - \ominus\end{array}\right\} = -\ominus$

FIG. 3B

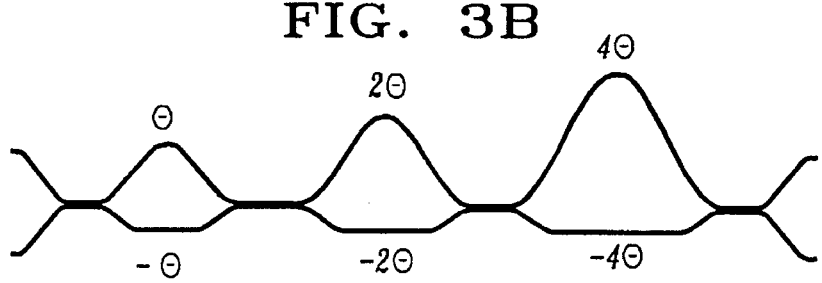

$\ominus + 2\ominus + 4\ominus = 7\ominus$     $-\ominus - 2\ominus - 4\ominus = -7\ominus$
$-\ominus + 2\ominus + 4\ominus = 5\ominus$     $\ominus - 2\ominus - 4\ominus = -5\ominus$
$\ominus - 2\ominus + 4\ominus = 3\ominus$     $-\ominus + 2\ominus - 4\ominus = -3\ominus$
$-\ominus - 2\ominus + 4\ominus = \ominus$     $\ominus + 2\ominus - 4\ominus = -\ominus$

FIG. 3C

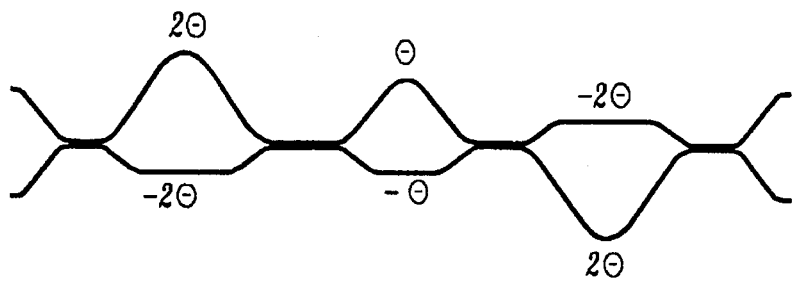

$2\ominus + \ominus + 2\ominus = 5\ominus$     $-2\ominus - \ominus - 2\ominus = -5\ominus$
$2\ominus - \ominus + 2\ominus = 3\ominus$     $-2\ominus + \ominus - 2\ominus = -3\ominus$
$\left.\begin{array}{l}-2\ominus + \ominus + 2\ominus \\ 2\ominus + \ominus - 2\ominus\end{array}\right\} = \ominus$     $\left.\begin{array}{l}-2\ominus - \ominus + 2\ominus \\ 2\ominus - \ominus - 2\ominus\end{array}\right\} = -\ominus$

MONOLITHIC OPTICAL WAVEGUIDE FILTERS BASED ON FOURIER EXPANSION

FIELD OF THE INVENTION

This invention relates to monolithic optical waveguide filters and, in particular, to a new type of monolithic filter providing plural optical paths wherein each optical path corresponds to a harmonic component of a Fourier series comprising the filter transmission function.

BACKGROUND OF THE INVENTION

Optical filters are important devices in optical fiber communications systems. Monolithic optical waveguide filters are particularly promising because they can perform complex circuit functionalities and because they can be made by mass production integrated circuit techniques.

The requirements of optical filters vary with applications. Many applications require a rectangular wavelength response in order to maintain a low-loss and wavelength-independent transmission in a passband and a high-level rejection to all wavelengths in a stopband. For example, anticipated telecommunications applications seek a 1.3/1.551 μm WDM filter a flat and low-loss passband at 1.280–1.335 μm and a –50 dB stopband at 1.525–1.575 μm. Another desired application is a gain equalization filter to flatten the gain of an Er-doped fiber amplifier chain. This requires an equalization filter with an amplitude response which is essentially the inverse of the amplifier gain.

Various devices have been proposed to fill these new, demanding requirements but none are fully satisfactory. Multilayer thin-film filters can be used to construct optical filters in bulk optics, but they are undesirable because they cannot be readily integrated and because of difficulties in coupling light to and from fibers. Mach-Zehnder (MZ) interferometers have been widely employed, but they have a sinusoidal response, giving rise to strongly wavelength-dependent transmission and a narrow rejection band. Other designs have encountered a variety of practical problems. Accordingly, there is a need for a new type of monolithic optical waveguide filter.

SUMMARY OF THE INVENTION

In accordance with the invention, a new type of monolithic optical waveguide filter comprises a chain of optical couplers of different effective lengths linked by different differential delays. The transfer function of the chain of couplers and delays is the sum of contributions from all possible optical paths, each contribution forming a term in a Fourier series whose sum forms the optical output. A desired frequency response is obtained by optimizing the lengths of the couplers and the delay paths so that the Fourier series best approximates the desired response. The filter is advantageously optimized so that it is insensitive to uncontrolled fabrication errors and is short in length. The wavelength dependence of practical waveguide properties is advantageously incorporated in the optimization. Consequently, the filter is highly manufacturable by mass production. Such filters have been shown to meet the requirements for separating the 1.3 and 1.55 μm telecommunications channels and for flattening the gain of Er amplifiers.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIGS. 3a, 3b and 3c are schematic examples of four-coupler chain filters of consecutive odd Fourier harmonics;

It is to be understood that these drawings are for purposes of illustrating the concepts of the invention and, except for graphical illustrations, are not to scale.

DETAILED DESCRIPTION

This description is divided into five parts. In part I, we describe the basic elements of a simple filter in accordance with our invention. In part II we describe the physical fabrication of the filter. Part III is directed to the design of the configuration of waveguides to obtain a desired filter response. Part IV discusses practical considerations which assist in the fabrication of practical filters; and Part V discusses preferred uses of the filters in optical fiber communications systems.

I. The Basic Elements Of A Simple Filter

Figure 9:
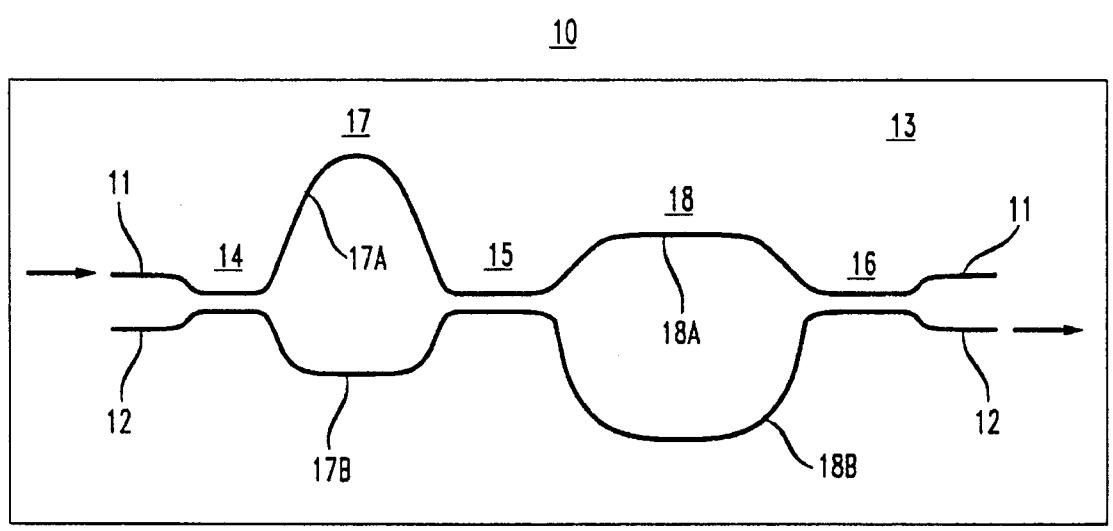
FIG. 9 is a schematic top view of a simple filter according to the invention.

Referring to the drawings, FIG. 9 is a schematic top view of a simple form of a monolithic optical waveguide filter 10 in accordance with the invention comprising a pair of optical waveguides 11 and 12 on a substrate 13 configured to form a plurality N of at least three optical couplers 14, 15, and 16 alternately connected by a plurality of N-1 delay paths 17 and 18. Each coupler is comprised of a region of close adjacency of the two waveguides where the exponential tail of light transmitted on each of waveguides 11 and 12 interacts with the other, coupling light from one waveguide to the other. The amount of power coupled from one waveguide to the other is characterized by the effective length of the coupler. The effective lengths of the couplers preferably differ from each other by more than 5%. The effective length of any coupler is within 5% of at most one other coupler.

Each delay path comprises a pair of waveguide segments between two couplers, for example segments 17A and 17B between couplers 14 and 15. The segments are configured to provide unequal optical path lengths between the two couplers, thereby providing a differential delay. For example in FIG. 9 upper segment 17A is longer than lower segment 17B, providing a differential delay which can be denoted positive. Differential delays associated with longer lower segments can be denoted negative. Delay path 18 provides a negative delay because lower segment 18B is longer than upper segment 18A. In the preferred form of filter 10, at least one differential delay differs from at least one other by 10% or more and at least one differential delay is opposite in sign from at least one other.

In operation, an optical input signal is presented at an input coupler, e.g. along waveguide 11 to coupler 14, and a filtered output is presented at an output coupler, e.g. along waveguide 12 at coupler 16. The sequence of couplers and delays provide light at the input with a plurality of paths to the output. In general there will be $2^{N-1}$ paths where N is the number of couplers. For example, the FIG. 9 device presents the following four paths:

1) segment 17A—segment 18A
2) segment 17A—segment 18B
3) segment 17B—segment 18A
4) segment 17B—segment 18B

In accordance with an important aspect of the invention, each of the optical paths of the filter provide light corresponding to a harmonic component in a Fourier series whose summation constitutes the transmission function of the filter. By proper choice of parameters one can closely approximate a desired transmission function. By choice of N and the set of differential delays, one can design a filter presenting a summation of odd Fourier components particularly useful for fabricating a filter with a rectangular response such as a 1.3/1.55 μm WDM filter. With a different N or a different set of differential delays, one can also design a filter presenting a summation of both even and odd Fourier components. A preferred odd harmonic filter can be made by providing differential delays with a normalized ratio of $\pm 1/\pm 2/\pm 2/ \ldots /\pm 2$ in any order, and a preferred all harmonic filter can be made by providing differential delays with a normalized ratio of $\pm 1/\pm 1/\pm 2/\pm 2/ \ldots /\pm 2$ in any order. Moreover, in the above ratios, any but not all of the differential delays of ±2 can be replaced by ±4 and any but not all of the differential delays of ±4 can in turn be replaced by ±8. In addition, for broadband filters, the wavelength dependence of practical waveguide properties is advantageously taken into account, which can alter the above proportional differential delays by up to ±25%. Thus in one preferred embodiment the delay paths provide, in any order, within ±25%, one differential delay of proportion ±1 and one or more differential delays of proportion ±2 or ±4 or ±8. In another preferred embodiment the delay paths provide, in any order, within ±25%, one differential delay of proportion ±1, one more differential delay of proportion ±1, and one or more differential delays of proportion ±2 or ±4 or ±8. Advantageously the filter can be combined with other filters, as by connecting the other filters to the waveguide outputs, thereby producing filter networks.

II. Physical Fabrication

The FIG. 9 structure is advantageously fabricated using planar optical waveguide technologies. Doped silica optical waveguides are preferred because they have low loss, low birefringence, are stable, and can couple to standard fibers well. However, the invention is equally applicable to other integrated optical waveguides including III–V semiconductor optical waveguides and optical waveguides diffused in lithium niobate. A description of the above waveguide technologies can be found in R. G. Hunsperger, "Integrated Optics: Theory and Technology", 3rd ed. (Springer-Verlag, Berlin, Heidelberg, New York 1991) which is incorporated herein by reference.

With doped silica planar waveguides, the FIG. 9 structure can be fabricated much as described in C. H. Henry et al., "Glass Waveguides On Silicon For Hybrid Optical Packaging," *J. Lightwave Technol.*, vol. 7, pp. 1530–39 (1989). In essence a base layer of silica glass ($SiO_2$) is grown on a silicon or quartz substrate. A thin core layer of doped silica glass is then deposited on the base layer. The core layer can be configured to a desired waveguide structure, such as that shown in FIG. 9, using standard photolithographic techniques. Subsequently another layer of silica glass is deposited to act as a top cladding. The waveguide cores have a higher refractive index than the base and top cladding layers, thereby guiding the lightwave much as a fiber. In contrast to a fiber, however, planar waveguide technologies are capable of more precise control of the waveguide structures and of integrating many devices into complex circuits.

In the specific examples discussed below, the following procedure was used to fabricate the filter. First a~15 μm thick base layer of undoped $SiO_2$ (HiPOX) is formed by oxidation of Si under high pressure steam. A core layer of 5 μm thick 7% P-doped $SiO_2$ (p-glass) is then deposited using low-pressure chemical vapor deposition (LPCVD). The core layer is annealed in steam at 1000° C. is patterned for single mode waveguides of 5 μm width with reactive ion etching (RIE). The center-to-center separation of waveguides in the coupler regions is 9.25–9.5 μm, and the minimum waveguide bend radius is 15 cm. A flow layer of about 1.5 μm thick B- and P-doped $SiO_2$ (BPTEOS) is subsequently deposited with LPCVD and annealed at 900° C. to fill the narrow gaps in between waveguide cores in the coupler regions. Finally, two layers of BPTEOS of 7.5 μm thickness each are deposited and annealed as the top cladding. The top cladding has almost the same refractive index (1.45 at λ=1.4 μm) as the base, and the core has a refractive index of about 0.63% higher than that of the base and top cladding.

III. Configuration Design And Optimization

Figure 1A:
FIGS. 1a, 1b and 1c are schematic design layouts of 1.3/1.55 μm wavelength division multiplexing filters (WDM filters)
Figure 1B:
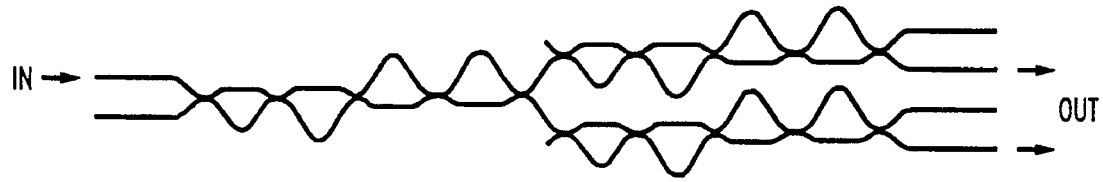
Figure 1C:
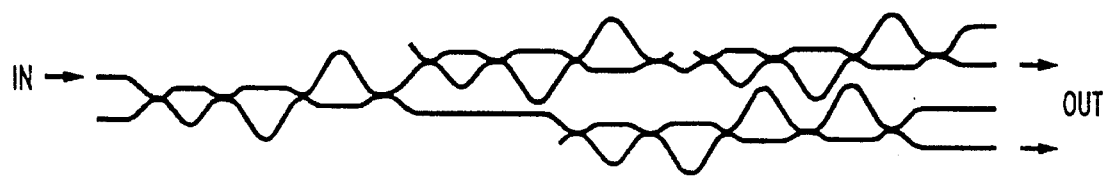

The basic structure of our filters consists of a chain of N arbitrary couplers and N-1 differential delays, where N>2. The transmission spectrum of such a chain (referred to as an N-coupler chain) is the sum of contributions from $2^{N-1}$ optical paths, each of which forms a term in a Fourier series. The length of the couplers and delay paths can be optimized so that this Fourier series best approximates a desired frequency response. As an initial example we describe design of the aforementioned 1.3/1.55 μm WDM filter with a rectangular response. FIGS. 1a, 1b and 1c are layout examples of 1.3/1.5 μm WDM filters. FIG. 1a shows a basic five coupler chain. Arrows indicate input and output ports. FIG. 1b shows a doubly filtered five-coupler configuration. FIG. 1c show a combination of double and triple filtering of four-coupler and five-coupler chains. When fabricated with the aforementioned doped silica waveguide technology, the total lengths of the 1a, 1b and 1c filters are 43, 75 and 75 μm, respectively, and the heights are 0.3, 0.6 and 0.6 mm, respectively. The vertical scale has been expanded 20 times for clarity.

The Principle of Sum Over All Possible Optical Paths

The electric fields at the two output ports of an ideal coupler of two identical waveguides are related to those at the input ports by a transfer matrix $$T_\phi = \begin{bmatrix} \cos\phi & i\sin\phi \\ i\sin\phi & \cos\phi \end{bmatrix} \quad (1)$$

where $i=\sqrt{-1}, \phi=\pi l'/2L, l'$ is the geometric length of the coupler, and L is the coupling length which is a measure of the strength of coupling between the two waveguides (not to be confused with the geometric length of the coupler). We refer to $l'/L$ as the effective length of the coupler.

Similarly, the transfer matrix characterizing the differential delay between two identical waveguides is $$T_\theta = \begin{bmatrix} e^{i\theta} & 0 \\ 0 & e^{-i\theta} \end{bmatrix} \quad (2)$$

where $\theta = \pi s\bar{n}/\lambda = \pi s\bar{n}v/c$, s is the difference in the lengths of the two waveguides, $\bar{n}$ is the effective refractive index of the waveguides, and $\lambda$, $v$, and $c$ are the optical wavelength, frequency, and velocity in free space. Note that a common phase factor has been ignored in Eq. 2 because it is non-essential to the filter response.

The transfer matrix of our waveguide filter, consisting of a chain of N couplers and N-1 differential delays characterized by $\phi_1, \phi_2, \ldots \phi_N$, and $\theta_1, \theta_2, \ldots \theta_{N-1}$, respectively, is given by $$T_{\phi\theta} = T_{\phi_N} T_{\theta_{N-1}} \cdots T_{\theta_2} T_{\phi_2} T_{\theta_1} T_{\phi_1} \quad (3)$$

From the above matrix product we see that the transfer function from any input port to any output port consists of a sum of the form $$t_{\phi\theta} = \Sigma f(\phi_1, \phi_2, \ldots \phi_N) e^{i(\pm\theta_1 \pm \theta_2 \ldots \pm \theta_{N-1})} \quad (4)$$

Note that $\theta$ is proportional to $v$ which is proportional to $1/\lambda$ if we ignore the wavelength dependence of $\bar{n}$.

Physically, equation 4 can be interpreted as the following principle that the response is the sum over all possible optical paths. The transfer function from any input port to any output port of a chain of N couplers and N-1 differential delays consists of the unweighted sum of contributions of $2^{N-1}$ distinct optical paths. Each of such contributions is a product of 2N-1 factors: traversing a coupler gives $\cos\phi$ without crossing and $i\sin\phi$ with crossing; traversing the longer arm of a differential delay gives $e^{i\theta}$ and the shorter arm gives $e^{-i\theta}$.

Figure 2A:
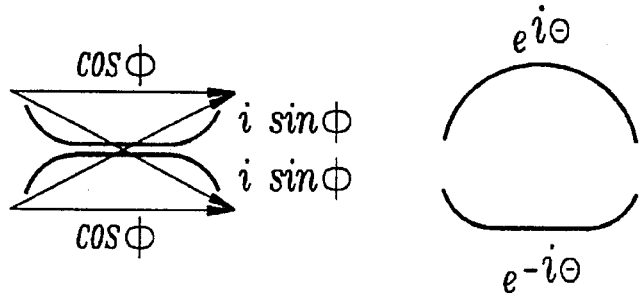
FIGS. 2a and 2b are diagrams useful in illustrating the design principle that the filter output is the sum of all optical paths.
Figure 2B:
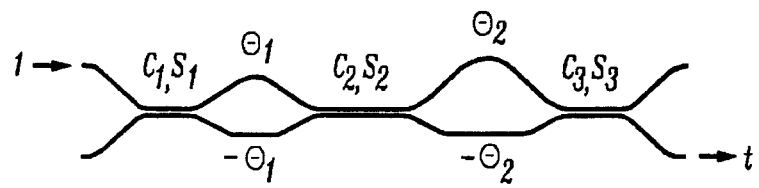

This principle is illustrated in FIGS. 2(a) and 2(b). FIG. 2a diagrams the contributions from the paths in a coupler and a differential delay. FIG. 2b shows the cross state of a three coupler chain. Where we have used the abbreviations $c \equiv \cos\phi$ and $s \equiv \sin\phi$. The letter t designates the transfer function. For N=3 there are four distinct optical paths from any input port to any output port, and the transfer function shown in FIG. 2(b) is a sum of four terms. For non-ideal couplers, $\cos\phi$ and $i\sin\phi$ should be corrected accordingly, but the above principle is still valid.

Construction of a Fourier Series

With arbitrary choices of the $\theta$'s, the sum in Eq. (4) is normally not a Fourier series because the terms in the sum do not normally represent harmonics. However, Eq. (4) becomes a truncated Fourier series if the ratio among the lengths of the differential delays satisfies certain conditions. In the following, we define $$\theta_j(v) = \gamma_j \theta_0(v), \; j=1,2, \ldots, N-1, \quad (5)$$

where $\theta_0$ contains the common wavelength-dependent part of $\theta_1, \theta_2, \ldots \theta_{N-1}$ and has the same period as the fundamental harmonic in the Fourier series. The unnormalized ratio $\gamma_1/\gamma_2/ \ldots /\gamma_{N-1}$ will be referred to as the $\theta$-ratio.

For WDMs with a rectangular response, because of the odd symmetry of the required transfer function, we need a Fourier series with only odd harmonics (see FIG. 4). We first consider the following two extreme conditions which give consecutive odd harmonics:

Condition A: If N is even and the $\theta$-ratio is $\pm 1/\pm 1/ \ldots /\pm 1$ with any sign combinations, $t_{\phi\theta}$ is a Fourier series with harmonics $\pm\theta_0, \pm 3\theta_0, \ldots, \pm(N-1)\theta_0$.

Condition B: If the $\theta$-ratio is $\pm 1/\pm 2/\pm 4/ \ldots /\pm 2^{N-2}$, in any order and with any sign combinations, $t_{\phi\theta}$ is a Fourier series with harmonics $\pm\theta_0, \pm 3\theta_0, \ldots, \pm(2^{N-1}-2)\theta_0$.

For a given even N, condition B gives the maximum number of consecutive odd harmonics while condition A gives the minimum. There are many other conditions in between, such as:

Condition C: If the 74-ratio is $\pm 1/\pm 2/\pm 2/ \ldots /\pm 2$, in any order and with any sign combinations, $t_{\phi\theta}$ is a Fourier series with harmonics $\pm\theta_0, \pm 3\theta_0, \ldots, \pm(2N-3)\theta_0$.

FIGS. 3a, 3b and 3c illustrate the construction of the Fourier harmonics using N=4 with examples of $\theta$ ratios of 1/1/1, 1/2/4, and 2/1/-2, each corresponding to a special case of conditions A, B, and C, respectively. Note that a negative sign in the $\theta$ ratio corresponds to an interchange of the longer and shorter delay arm. For clarity, we have used $\theta$ in the drawing for $\theta_0$. A negative $\phi$ cannot be physically realized. However, $\pi - \phi$ is equivalent to $-\phi$ in that the transfer functions of the two cases differ only by a constant phase.

While consecutive odd harmonics are needed for WDMs, other filter functions may need even harmonics as well. A Fourier series with consecutive even harmonics is constructed when one of the sections corresponding to the $\pm 1$'s in conditions A, B, and C is taken out of the N-coupler chain, resulting in an (N-1)-coupler chain. A Fourier series with all consecutive harmonics can also be constructed by halving all the delays in conditions A, B, and C and adding another section with the minimum unit delay. The $\theta$-ratios for conditions A, B, and C become $\pm\frac{1}{2}/\pm\frac{1}{2}/ \ldots /\pm\frac{1}{2}$(and N is odd), $\pm\frac{1}{2}/\pm\frac{1}{2}/\pm 1/ \pm 2/ \ldots /\pm 2^{N-4}$, and 35 $\frac{1}{2}/\pm\frac{1}{2}/\pm 1/ \ldots /\pm 1$, respectively. The corresponding normalized ratios of the differential delays are $\pm 1/\pm 1/ \ldots /\pm 1, \pm 1/\pm 1/\pm 2/\pm 4/ \ldots /\pm 2^{N-3}$, and $\pm 1/\pm 1/\pm 2/ \ldots /\pm 2$, respectively.

Optimization for a Given Filter Response

Figure 4A:
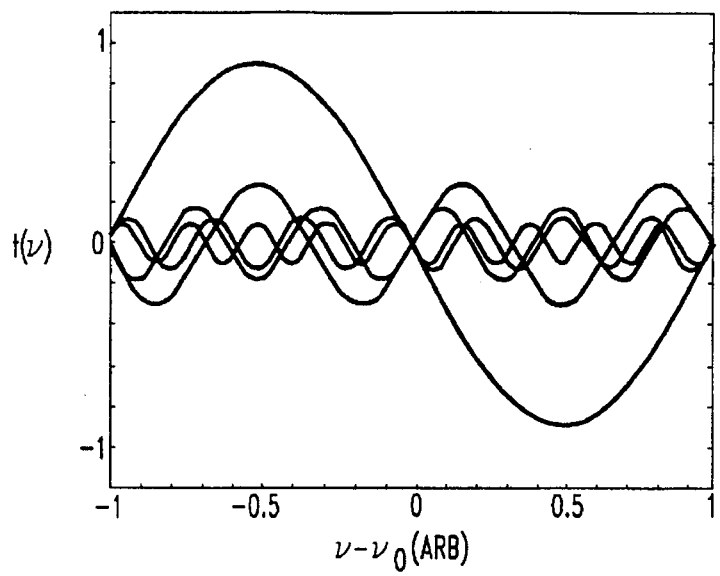
FIGS. 4a, 4b, and 4c illustrate the approximation of a rectangular filter response by a Fourier series.
Figure 4B:
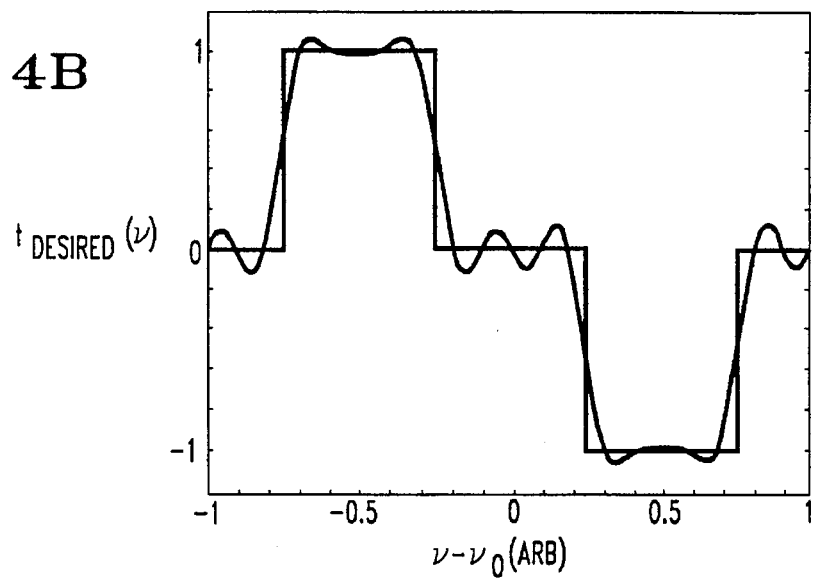
Figure 4C:
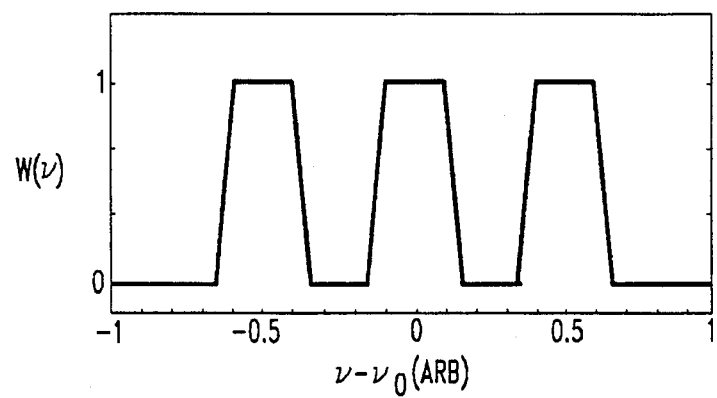

We have shown that the transfer function of a chain couplers and delays can form a truncated Fourier series. FIG. 4 further demonstrates the basis of approximating the frequency response of a desired filter by such a truncated Fourier series (for the purpose of illustration, we have ignored the phase). The MZ interferometer (N=2) only has the fundamental harmonic and its frequency response sinusoidal as shown by the solid curve in FIG. 4(a). In contrast, the desired rectangular response of a filter is shown by the solid curve in FIG. 4(b). For N>2 under conditions A, B, or C, the transfer function also contains higher order harmonics, shown by the broken curves in FIG. 4(a). The sum of the fundamental and higher order harmonics, as shown by the broken curve in FIG. 4(b), can approximate the rectangular response if their amplitudes and phases are chosen correctly. In the following, in order to give a clear physical picture, we first ignore the wavelength dependence of L (and hence the $\phi$'s are constants) and $\bar{n}$ and discuss the more general case later.

First, the common factor $\theta_0$ of the differential delays can be determined solely by the positions of the passband and the stopband, similar to the case of a simple MZ. We want the fundamental harmonic to have a phase of 0 or $\pi$ at the center of the stopband and $\pi/2$ at the center of the passband. Therefore $$\theta_{0_s}/\pi = \bar{s}\bar{n}/\lambda_s = m, \text{ and } \theta_{0_p}/\pi = \bar{s}\bar{n}/\pi_p = m \pm \frac{1}{2}, \quad (6)$$

where m is an integer, which we refer to as the order of the filter, and the subscripts p and s refer to the center of passband and stopband. Since the output ports can be interchanged, there is another configuration corresponding to the interchange of s and p in Eq. 6. For our 1.3/1.55 μm WDM filter, the best solutions are (m=3, $\lambda_p$=1.322 μm, $\lambda_s$=1.542 μm) and (m=3, $\lambda_p$=1.566 μm, $\lambda_s$=1.305 μm). Here we have explicitly used the fact that the transfer function expressed by the Fourier series is periodic in frequency.

We will now find the values of the φ's under a given condition that renders the Fourier series with consecutive odd harmonics. Note that, except under condition A, the number of harmonics exceeds the number of couplers N. Therefore, the number of Fourier coefficients to be determined is generally larger than the number of free variables available. Moreover, for broadband filters, the phase response is not important, and we only require $|t_{\phi 0}|^2$ to have the desired response which is rectangular in our 1.3/1.55 WDM. We therefore minimize an error function to solve for the φ's under a given θ-ratio as in the following:

$$E_{\phi^0} \equiv \int d\,v \cdot w(v)(|t_{\phi 0}| - t_{desired}(v)|)^2 = \min \quad (7)$$

where w(v) is a positive weighting function, and the integration is done in the passband and stopband of interest. Since for our 1.3/1.55 μm WDM we do not constrain the transition between the passband and stopband, we set w(v)=0 in those regions (as in FIG. 4(c)). Eq.(7) represents a nonlinear minimization problem which can be solved numerically by iterative methods such as the simplex or conjugate gradient methods. Although in our design of the 1.3/1.55 μm WDM we have ignored the phase response, if a particular phase response is desired, it can also be put into the above equation and optimized together with the amplitude.

Note that $E_{\phi^0}$ has many local and equivalent minima which correspond to different configurations having similar or the same amplitude response. For example, if one of the couplers in the middle of an N-coupler chain is a full coupler (φ=(n+½) π where n is an integer) or a null coupler (φ=nπ), this coupler and the two differential delays around it degenerate into the equivalence of a single differential delay, and we effectively have an (N−1)-coupler chain. Thus we can reproduce a minimum in $E_{\phi^0}$ of an (N−1)-coupler chain with an N-coupler chain, which is a local minimum. Moreover, if the length of a coupler is changed in such a way that φ is replaced by φ+2nπ or (2n−1)π−φ, then $|t_{100}|$ is unchanged, and we have an equivalent minimum. Furthermore, a different sequence of θ's or a different set of ± signs in front of the θ's gives different equivalent and local minima. The different combinations of these variations give rise to large number of configurations. Interchanging the two output ports brings in another set of distinct configurations (which correspond to $\phi_1 = \pi/4$ and $\phi_2 = 3\pi/4$ for the conventional MZ). Therefore, physical insight is often needed to get good starting parameters for the iterations to arrive to the best solution. We usually start with the original MZ (N=2) and successively increase N, taking the results of N−1 as the starting parameter of N.

We still have to find the best choice of the θ-ratio that gives the closest approximation of the required filter response for a given N. In the extreme of condition A, all the Fourier coefficients can be satisfied independently, but the number of harmonics in the series is small. In the other extreme, under condition B, although the number of harmonics is large, they are greatly constrained by the number of free variables. Therefore, there is an optimum condition in between A and B. Our numerical calculations show that condition C is in fact the optimum for filters with a rectangular response.

Figure 5A:
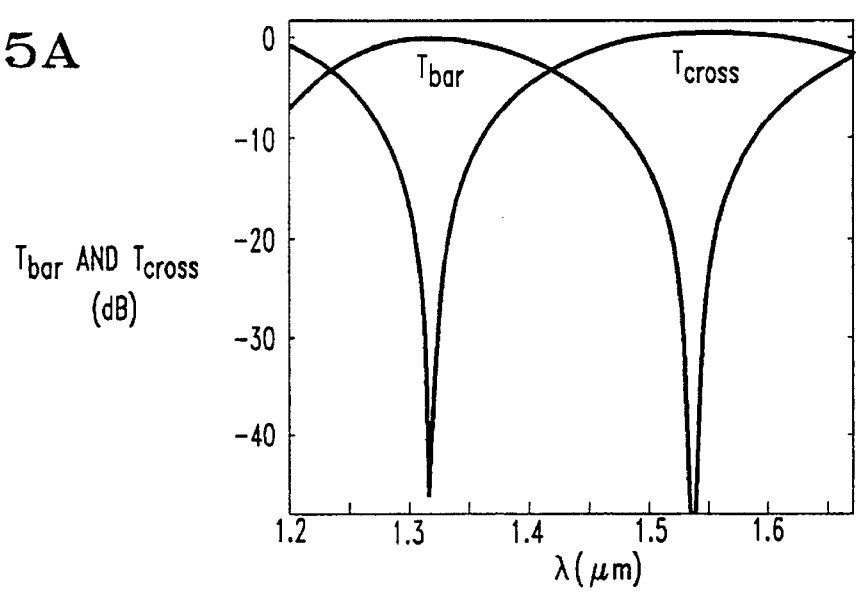
FIGS. 5a, 5b, 5c, 5d, 5e and 5f show the effect of various steps to optimize a five coupler chain filter.

FIGS. 5a through 5f illustrate the effect of various steps to optimize the configuration design. FIG. 5a shows the bar and cross state power transmission of a conventional Mach-Zehnder interferometer in a semi-log plot.

Figure 5B:
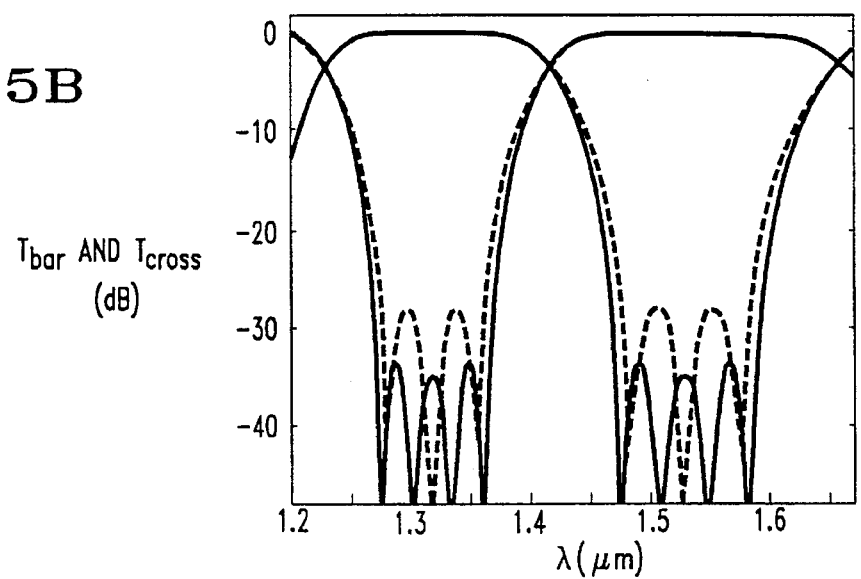

The solid curves in FIG. 5(b) are the bar- and cross-state transmission spectrum of a five-coupler chain satisfying condition C with a θ-ratio of 1/2/−2/−2 (see FIG. 1 (a) for the layout), optimized when assuming L and $\bar{n}$ are independent of λ. Compared to the spectrum of the corresponding MZ shown in FIG. 5(a), the width and flatness of the passband, as well as the width and rejection of the stopband, are greatly improved. The dashed curves in FIG. 5(b) show the corresponding transmission of a six-coupler chain with a θ-ratio of 1/1/1/1/1 (i.e., condition A). Compared to the solid curves of the five-coupler 1/2/−2/−2 chain, the passband becomes narrower and the rejection lower. In fact, the response of the this six-coupler chain is the same as a four-coupler chain with a θ-ratio of 1/2/2. Similarly, when we replace one or more of the 2's in the 1/2/−2/−2 chain by 4 or 8, we find that the filter response becomes worse as well as the device length becomes longer. We therefore conclude that condition C gives the most efficient WDM configuration.

Wavelength Dependence of the Coupling Length and the Effective Refractive Index

Figure 5C:
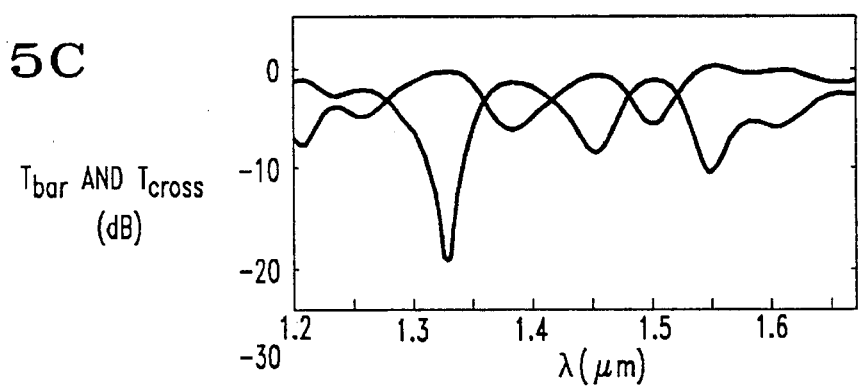

So far we have assumed that the coupling length L and the effective refractive index $\bar{n}$ do not depend on wavelength, which is only valid for narrow-band WDMs. In reality, L inevitably decreases as the the wavelength is increased, because the optical field is more confined at shorter wavelength. With our planar waveguide fabrication process, L increases by about a factor of two as λ changes from 1.55 μm to 1.3 μm, implying that a 3 dB coupler at 1.3 μm becomes a full coupler at about 1.55 μm. Moreover, $\bar{n}$ also changes with π, because of the change in confinement and the dispersion of the waveguide material, but the relative change is much smaller (about 0.5% for our waveguide) than L. FIG. 5(c) shows the response of the same five-coupler chain as in FIG. 5(b) (which was designed for $L=L|_{\lambda=1.42\,\mu m}$=constant and $\bar{n}=\bar{n}|_{\lambda=1.42\,m}$=constant), except now the wavelength dependent L and $\bar{n}$ are used in calculating the spectrum. It is apparent that for wide-band WDMs, such as our 1.3/1.55 μm WDM, the λ dependence of L and $\bar{n}$ is advantageously considered in the design.

Figure 5D:
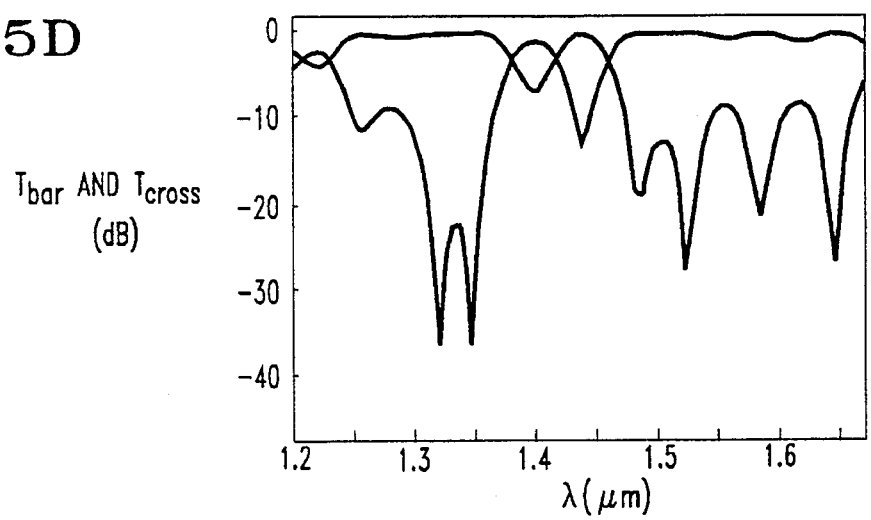
Figure 5E:
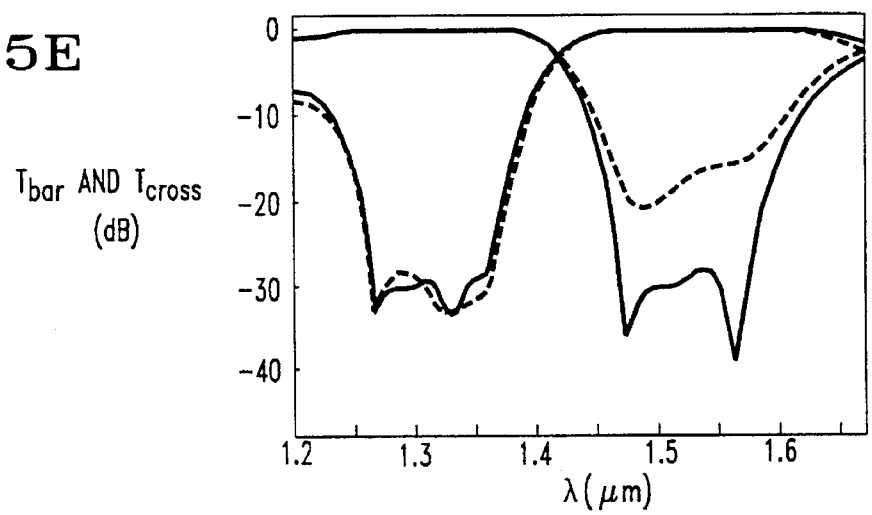

With the λ dependent L and $\bar{n}$, each term in Eq. (4) is no longer completely periodic, and it becomes necessary to optimize the θ's in Eq. 6 as well as the φ's to get the best filter response. This is illustrated by the solid curves in FIGS. 5(d) and (e). FIG. 5(d) shows the response of the five-coupler 1/2/−2/−2 chain when only the coupler lengths have been optimized with the λ-dependent L and $\bar{n}$, while FIG. 5(e) shows the same when both the coupler lengths and the delay lengths have been optimized. Only in the latter case have we recovered the rectangular response comparable to that for constant L and $\bar{n}$. With our planar waveguide for the 1.3/1.55 μm WDM example, the θ-ratio change is from 1/2/−2/−2 to 1.187/1.978/−1.849/−2.031. In the re-optimization, we usually use the results for constant L and $\bar{n}$ as starting parameters.

In summary, in our optical filter with a chain of arbitrary couplers and differential delays, the basic building block has a quasi-periodic transfer function. The transfer function of the chain is the sum of contributions from all possible optical paths, each of which can form a term in a Fourier series. The task of designing a filter is to optimize the lengths of the couplers and the differential delays so that this Fourier series best approximates the desired filter response. Fourier expansion not only gives a direct and intuitive description of the physical principle of the device, but also provides powerful and flexible design procedures. Our Fourier expansion approach enables us to find the most efficient θ-ratio (which is not 1/1/1/1/ . . . used in lattice filters), to include the λ-dependence of L and $\bar{n}$ which renders the θ-ratio non-integral, and, as will be shown next, to arrive at fully optimized configurations most immune to dominant fabrication errors which involve negative signs in the θ-ratio.

IV. Practical Considerations

Because of the λ-dependence of L and $\bar{n}$, many of the equivalent configurations discussed earlier become inequivalent, i.e., the degeneracies are removed. We thus have many filter configurations which give somewhat different response. The number of such configurations is large.

Figure 5F:
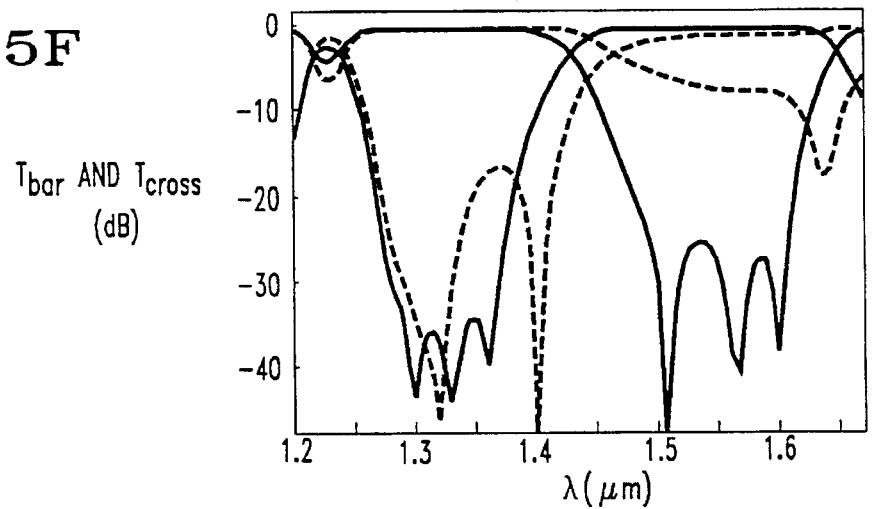

The transmission of two of these configurations for our 1.3/1.551 μm WDM is shown in FIGS. 5(e) and (f). FIG. 5(f) shows a five-coupler chain the same as that in FIG. 5(e) except the θ-ratio is approximately 1/2/2/2. The filter response is also similar to that in FIG. 5(e) except for some fine details. However, a dramatic difference develops between the two cases when the coupling length deviates from the nominal values, as shown by the dashed curves in FIG. 5(e) and (f) for which a 10% overall increase in L has been used in calculating the spectra. The design in FIG. 5(e) is less sensitive to the change in L than the design in FIG. 5(f). For practical fabrication, the coupling length is the parameter most susceptible to uncontrolled fabrication errors (e.g., errors in the geometry and refractive index of the core), and the design in FIG. 5(f) would have a low yield. Therefore, we always choose out of many configurations the few which are most stable against overall changes in the coupling length as well as with the best filter response and short couplers.

We have designed filters with various response shapes and bandwidths, and for all cases the configurations most stable against overall changes in L have negative signs in the θ-ratio. While the problem of stability is complicated in nature partly due to the wavelength-dependence of L, a simple physical interpretation is as follows. For a filter with rectangular response to be stable against fabrication errors, the partial sum of the fundamental and, successively, those of the low-order harmonics in the Fourier series of the transfer function should be stable near their zeros. If half of the θ's have negative signs, the fundamental and low-order harmonics correspond to the optical paths crossing the smallest number of couplers, which can be regarded as the dominant optical paths. The zeros of the partial sums produced by these dominant paths are stable against errors in L because they tend to depend only on the ratio of the lengths of the small number of crossed couplers. Filters with negative θ's usually also have short couplers. For the stable 1.3/1.55 μm WDM example shown earlier, the θ-ratio is 1.187/1.978/−1.849/−2.031. This stable design is important for manufacturability.

Our design approach based on Fourier expansion also gives us clear guidelines to determine the number of stages of the chain. In principle, as the number of coupler stages is increased, the flatness of the passband and the rejection in the stopband will be constantly improved. In practice, however, several factors limit N from being too large. The first limitation is chip size. With our current fabrication process on a five-inch wafer, the largest N is about 14 for short delay arms (such as those used in our 1.3/1.55 μm WDMs) without using waveguide U-turns (which would consume a large space on the wafer). This limit of N can be increased, however, if high-delta waveguides or U-turns are used. The second limitation is excess insertion loss, due to the bends at the ends of each coupler and intrinsic loss in the waveguides. A more subtle yet important consideration is fabrication accuracy and non-ideal effects of couplers and delays. As N is increased, higher order Fourier components, with smaller Fourier coefficients, come into play. However, if the fabrication error exceeds the accuracy required by the smallest Fourier coefficient, increasing N no longer improves the performance of a real device. Similarly, because of non-ideal effects such as excitations to higher order modes at the ends of couplers and asymmetric loss in the delay paths, Eq. (4) is only an approximate description of the transfer function of a real device, and N should be small enough that every term in Eq. 4 is meaningful. For our 1.3/1.55 μm WDMs we find that N=3 to 7 is adequate and practical.

To enhance the stopband rejection to >30 dB, We have adopted double- and triple-filtering schemes using short chains of N=3 to 7, as illustrated in FIG. 1 (b) and (c). FIG. 1 (b) is a double filtered version of (a) and (c) is a combination of double and triple filtering of four-coupler and five-coupler chains. For such a multistage filter, the transfer function is simply the product of that of each stages:

$$t^{(M)}_{\phi\theta} = t^{(1)}_{\phi\theta} \cdot t^{(2)}_{\phi\theta} \cdots . \tag{8}$$

The unwanted light power is thrown away in the extra ports instead going to the other output port, and the crosstalk is reduced at the expense of rounding the flatness of the passband. This can be regarded as a further optimization of the filter under the constraints of chip length and fabrication errors.

V. System Applications

In this section, we discuss the potential applications of our filters in optical fiber communication systems.

Our new filter (first, without double or triple filtering) has the following properties. First, the two output ports are complimentary in that the power in the two ports always sums up to the input power. Thus the passband of one output is the stopband of the other (and for this mason we have often used the terms "passband" and "stopband" without specifying exactly where they are). Second, the device is symmetric and reciprocal such that if the two input ports and simultaneously the two output ports are interchanged, or if the input ports are interchanged with the output ports, the transmission remains the same up to a constant phase factor. Thus the device only has two distinct transmission states: the bar state and the cross state. Third, the device is highly directional, i.e., the light propagating in one direction is independent of the light propagating in the reverse direction.

Figure 6:
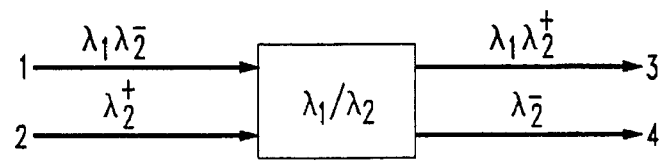
FIG. 6 illustrates the basic functions of a coupler-delay chain as a four port optical filter.

The basic functions of the device are illustrated in FIG. 6, where $\lambda_1$ and $\lambda_2$ are the passband of the bar and cross state respectively, or vice versa. (Also, not shown here for simplicity, both $\lambda_1$ and $\lambda_2$ can be groups of wavelengths.) As an add-drop filter, it transmits $\lambda_1$ from port 1 to port 3, while dropping $\lambda_2^-$ into port 4 and adding the $\lambda_2^+$ from port 2.

Note that the direction of any of the signals can be reversed. If $\lambda_2^-$ is absent in port 1, the device works as a wavelength division multiplexer which combines $\lambda_1$ and $\lambda_2^+$ in port 3. Similarly, if $\lambda_2^+$ is absent in port 2, the device works as a wavelength division de-multiplexer which separates $\lambda_1$ to port 3 and $\lambda_2^-$ to port 4. In the de-multiplexer, if the light in one of the output ports is simply discarded, the device works as a simple filter.

With double or triple filtering, the situation is more complicated. The filter now has more than four ports, not all of which are used. However, all the above functions can still be realized with different configurations using the appropriate ports.

Multiplexing and De-multiplexing of the 1.3 and 1.55 μm Communication Bands

Most existing fiber communication systems use the 1.3 μm band mainly because fibers have zero dispersion and relatively low loss around 1.3 μm and other components were also first developed for 1.3 μm. Fibers have even lower loss away from the dispersion zero around 1.55 μm, and Er-doped fiber amplifiers (EDFA) are also readily available in the same wavelength range. Therefore, the 1.55 μm band is expected to coexist with the 1.3 μm band in many future communication systems, and 1.3/1.55 82 m WDM filters will become a key component in such systems.

To accommodate analog-signal transmission and future upgrade, 1.3/1.55 μm branching devices used for some controlled environments should have passbands wider than 1.280–1.335 μm and 1.525–1.575 μm for the two output channels respectively, and the crosstalk should be lower than −50 dB. For other applications, the required passbands are even wider (100 nm). Our new filters fabricated with the planar waveguide technology are ideal candidates for these WDMs, because they have the rectangular response required, they are monolithic and reliable, and they can be integrated with other components.

Using the double and triple filtering approach, we have designed 1.3/1.55 μm WDMs meeting the above specifications, which correspond to the layouts in FIGS. 1(b) and (c). FIG. 1(b) is a double filtered version of (a) and FIG. 1(c) is a combination of double and triple filtering of four-coupler and five-coupler chains. The triple filtering in FIG. 1(c) is only in the 1.3 μm path to enhance the rejection at 1.55 μm. They have 10 or 12 couplers in series in total and when fabricated with the aforementioned doped silica waveguide technology they are 75 mm long and 0.6 mm wide. For the five-coupler chains in FIG. 1(a), (b), and (c), the geometric lengths of the couplers are 757,795, 73, 1209, and 452 μm, and the geometric path differences are 3.754, 6.256, −5.849, and −6.42 μm. For the four-coupler chain in FIG. 1(c), the geometric lengths of the couplers are 677, 979, 199, and 1241 μm, and the geometric path differences are 2.483, 5.733, and −6.055 μm.

Figure 7A:
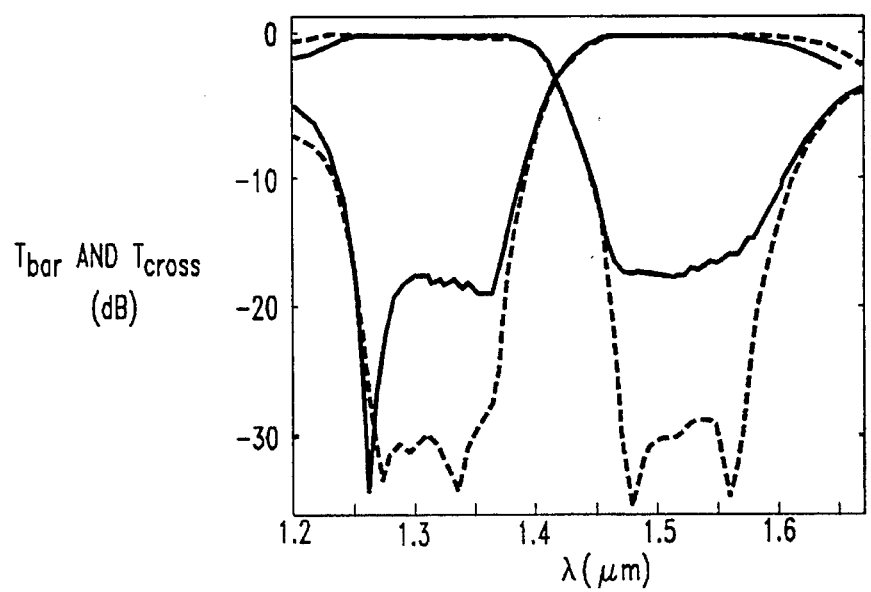
FIGS. 7a, 7b and 7c are graphical illustrations of the transmission spectra for embodiments of WDM filters of the designs shown in FIGS. 1a, 1b and 1c, respectively.
Figure 7B:
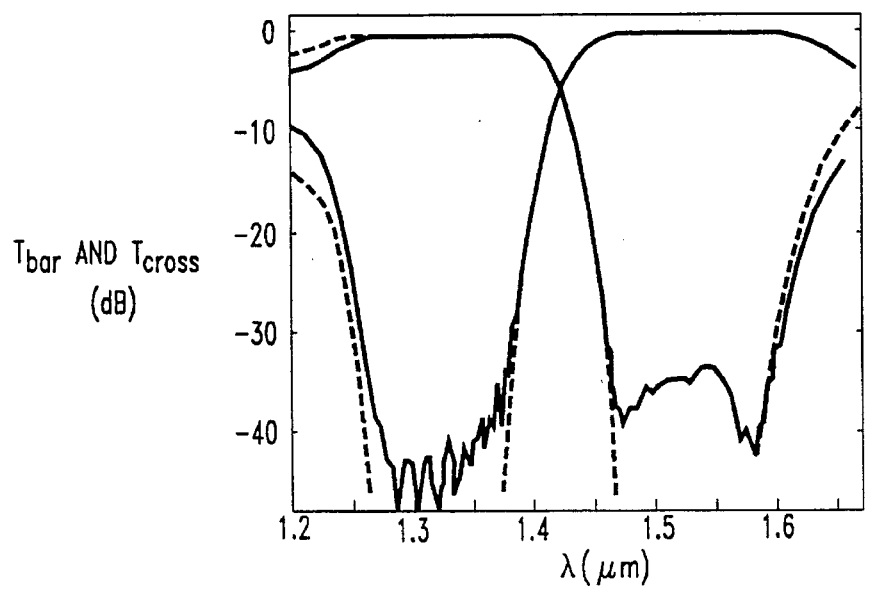
Figure 7C:
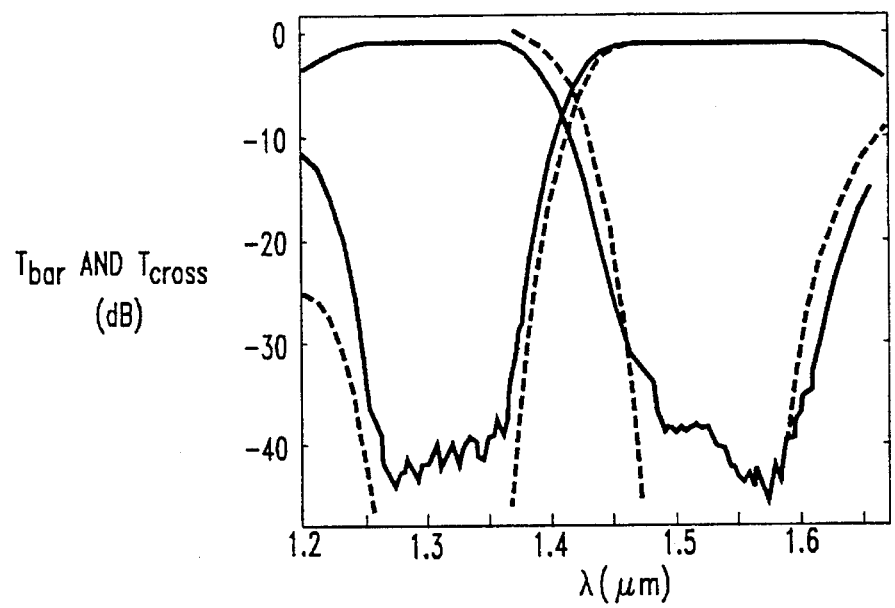

The solid curves in FIG. 7 show our preliminary results for the designs shown by the corresponding dashed curves. The layout of the three designs is shown in FIGS. 1(a), 1(b) and 1(c). For all the designs the measured data closely resembles the designed response. Wide and flat passbands around both 1.31 μm and 1.55 μm are apparent. Also as designed, the stopbands are wide (~100 nm) and the transitions are sharp. These aspects of our WDMs are better than those of any broadband monolithic WDMs previously reported.

Gain Equalization Filters for EDFA Systems

Er-doped fiber amplifiers (EDFA) have great advantages over other optical amplifiers used in fiber communication systems, but have a highly wavelength-dependent gain. For long-range (>100 km) transmission of lightwave signals through optical fibers, EDFAs are inserted at spans of every ~50 km to compensate the attenuation of signals in the fiber. In such a system where many EDFAs are cascaded, in order to use the full bandwidth of the EDFAs (1.53–1.56 μm), a gain equalization filter must be used along with each EDFA to flatten the overall system gain. The response of these filters is roughly the inverse of the gain of the EDFA, and has a peak at 1.538 μm with asymmetric wings. Despite the irregular shape required, these filters can be readily designed with our Fourier expansion approach and fabricated using the planar waveguide technology.

Figure 8:
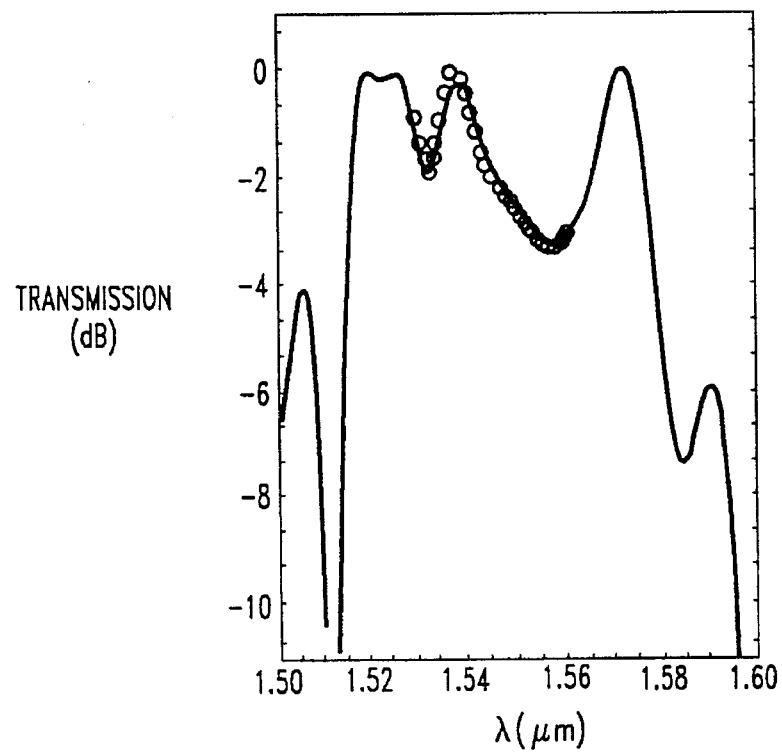
FIG. 8 shows the amplitude response of a gain equalization filter in accordance with the invention designed to flatten the overall gain of Er-doped amplifiers.

The solid curve in FIG. 8 shows a designed EDFA gain equalization filter using a seven-coupler chain. The circles represent the required filter response, optimized for maximum end-to-end flatness over a 30 nm bandwidth, for a system with 40 km spans, 2000 km total length, using two-stage EDFA (type E200S) with dual 90 mW 980 nm pumps. Because of the sharp features around 1.54 μm, a θ-ratio of approximately 1/–2/–2/–2/–4/–4 is found to be better than 1/2/2/2/2/2. The geometric lengths of couplers are 1002, 861,571, 1112, 1367, 842, 1180 μm, and the geometric path differences are 13.56,−27.09,−26.93,−26.80, −53.16,−53.70 μm. The design is also relatively stable against overall errors in the coupling length.

It is to be understood that the above-described embodiments are illustrative of only a few of the many possible specific embodiments which can represent applications of the principles of the invention. Numerous and varied other filter arrangements can be made by those skilled in the art without departing from the spirit and scope of the invention.

We claim:

1. A monolithic optical waveguide filter comprising a pair of optical waveguides forming a sequence of N>2 couplers alternating with delay paths between said couplers, wherein a) said couplers and delay paths are selected such that there are $2^{N-1}$ distinct paths from an input to an output of the optical waveguide filter, and are furthermore selected such that an input signal radiation simultaneously propagates through a multiplicity of said $2^{N-1}$ distinct paths from the input to the output of the optical waveguide filter; and b) an effective length of one of said couplers differs by more than 5% from the effective length of another coupler, and a differential delay provided by one of said delay paths differs by more than 10% from the differential delay provided by another of said delay paths.

2. A monolithic optical waveguide filter according to claim 1 wherein the differential delay provided by at least one of said delay paths is opposite in sign from the differential delay provided by another of said delay paths.

3. A monolithic optical waveguide filter comprising a pair of optical waveguides forming a sequence of N>2 couplers alternating with differential delay paths between said couplers, said couplers and differential delay paths selected such that there are $2^{N-1}$ distinct optical paths between an input at one end of said sequence and an output at the other end thereof, and furthermore selected such that an input signal radiation propagates simultaneously through a multiplicity of distinct optical paths from said input to said output, wherein each path of said multiplicity presents at said output an optical signal whose amplitude and phase correspond to a term of a Fourier series comprising a filter transmission function.

4. A monolithic optical waveguide filter according to claim 3 wherein each path presents a term in an odd Fourier series.

5. A monolithic optical waveguide filter according to claim 3, wherein said delay paths provide, in any order, within ±25%, one differential delay of proportion ±1 and one or more differential delays of proportion ±2 or ±4 or ±8.

6. A monolithic optical waveguide filter according to claim 5 wherein an effective length of one of said couplers differs by more than 5% from the effective length of another coupler.

7. A monolithic optical waveguide filter according to claim 5 wherein the differential delay provided by one of said delay paths is opposite in sign from the differential delay provided by another of said delay paths.

8. A monolithic optical waveguide filter comprising a pair of optical waveguides forming,, a sequence of N>2 couplers alternating with differential delay paths between said couplers, said couplers and differential delay paths selected such that there are $2^{N-1}$ distinct optical paths between an input and an output, and furthermore selected such that an input signal radiation propagates simultaneously through a multiplicity of distinct optical paths from said input to said output, wherein said differential delay paths provide, in any order, within ±25%, two differential delays of proportion ±1 and one or more differential delays of proportion ±2, or ±4 or ±8.

9. A monolithic optical waveguide filter according to claim 8 wherein an effective length of one of said couplers differs by more than 5% from the effective length of another coupler.

10. A monolithic optical waveguide filter according to claim 8 wherein the differential delay provided by one of said differential delay paths is opposite in sign from the differential delay provided by another of said differential delay paths.

11. A filter according to claim 1 or 2 or 3 or 4 or 5 or 8 wherein 3≦N≦7.

12. A monolithic optical waveguide filter according to claim 1 further comprising one or more additional optical filters optically coupled to said pair of optical waveguides to form a filter network.

13. A monolithic optical waveguide filter according to claim 4 or 12 wherein said optical couplers and delay paths are selected to provide a rectangular filter response.

14. A monolithic optical waveguide filter according to claim 4 wherein said optical couplers and delay paths are selected to provide a rectangular filter response for separating 1.3 micrometer wavelength light from 1.55 micrometer wavelength light.

15. A monolithic optical waveguide filter according to claim 4 wherein said optical couplers and delay paths are selected to provide a filter response inverse to the gain spectrum of an erbium-doped fiber amplifier.

16. A monolithic optical waveguide filter according to claim 1, wherein said multiplicity is all of said $2^{N-1}$ distinct paths.

17. A monolithic optical waveguide filter according to claim 3, wherein said multiplicity is all of said $2^{N-1}$ distinct paths.

* * * * *